United States Patent [19]

Kawahara et al.

[11] 4,368,015

[45] Jan. 11, 1983

[54] TIRE VULCANIZER

[75] Inventors: Masakatsu Kawahara, Amagasakishi; Itaru Amano; Kazuhiko Nakagawa, both of Kobe; Yasuhiko Fujieda, Akashi; Kashiro Ureshino; Mitsunori Asada, both of Kobe, all of Japan

[73] Assignee: Kabushiki Kaisha Kobe Seiko Sho, Kobe, Japan

[21] Appl. No.: 295,146

[22] Filed: Aug. 21, 1981

[30] Foreign Application Priority Data

| Aug. 23, 1980 [JP] | Japan | 55-116807 |
| Aug. 23, 1980 [JP] | Japan | 55-116808 |
| Aug. 23, 1980 [JP] | Japan | 55-116809 |
| Nov. 22, 1980 [JP] | Japan | 55-165493 |

[51] Int. Cl.³ ............................................ B79H 5/02
[52] U.S. Cl. ........................................ 425/29; 425/33; 425/36; 425/43; 425/52; 425/58; 425/143; 425/149; 425/214
[58] Field of Search ................ 425/29, 30, 32, 33, 425/34, 35, 36, 37, 38, 43, 46, 48, 52, 58, 143, 144, 149, 167, 214

[56] References Cited

U.S. PATENT DOCUMENTS

| 2,204,531 | 6/1940 | Erbguth et al. | 425/29 |
| 3,396,221 | 8/1968 | Balle et al. | 425/43 X |
| 3,571,855 | 3/1971 | Hofer et al. | 425/214 X |
| 3,583,467 | 6/1971 | Bennett et al. | 425/144 X |
| 3,659,973 | 5/1972 | Yoshida et al. | 425/58 X |
| 3,704,973 | 12/1972 | Renfrew | 425/167 X |
| 3,785,279 | 1/1974 | Fails | 425/143 X |
| 3,794,457 | 2/1974 | Gaguit | 425/38 X |
| 3,837,770 | 9/1974 | Gaguit | 425/33 |
| 3,846,058 | 11/1974 | Yoshida et al. | 425/38 |
| 4,222,721 | 9/1980 | Gado | 425/30 X |

Primary Examiner—J. Howard Flint, Jr.
Attorney, Agent, or Firm—Oblon, Fisher, Spivak, McClelland & Maier

[57] ABSTRACT

The specification describes a tire vulcanizer adapted for use in performing the shaping and curing operation of a green tire efficiently and safely. The vulcanizer is characterized by means for lifting or lowering an upper ring, which includes a rotary means consisting of a ball screw shaft and nut cylinder, and a mechanism adapted to render said ball screw shaft rotate freely upon receiving a signal which is generated upon the completion of the shaping and curing operation.

11 Claims, 6 Drawing Figures

TIRE VULCANIZER

BACKGROUND OF THE INVENTION

1. Field of the Invention

This invention relates to the main mechanism of a tire vulcanizer, and more particularly to a driving system for the main mechanism.

2. Description of the Prior Art

In a tire vulcanizer, there is employed a main mechanism for performing the shaping and other processing work of green tires. An example of such a main mechanism is disclosed in U.S. Pat. No. 2,775,789 in which an upper ring for holding a bladder such as a rubber bag is constructed in such a way that the bladder may be operably inflated or deflated by vertically displacing a piston rod to which the upper ring is coupled. To move the piston rod up and down, a piston is connected with the piston rod and is housed in a lower portion of a lift cylinder. A fluid is introduced into a fluid chamber provided in the lower portion of the lift cylinder and another fluid chamber formed in the interior of the piston rod through a pipe which communicates with each of the fluid chambers. On the other hand, for shaping and vulcanizing a green tire, high temperature steam is charged into the interior of the bladder through a pipe which communicates the interior and the shaping and curing of the green tire is performed through the bladder.

In a tire vulcanizer equipped with such a main mechanism as referred to in the above, the driving mechanism makes use of a fluid as its driving medium regardless whether it is hydraulic or pneumatic. Thus, a heat loss arises on the lower ring at locations where said lower ring is brought into contact with the bladder, thereby upsetting the heat balance between the upper and lower rings. This in turn deteriorates the uniformity of the vulcanization degree to a certain extent. This drawback may be compensated for by prolonging the curing time in view of the heat loss. However, such a prolonged curing time requires a significant amount of heating medium and results in a wasting of thermal energy.

Where green tires of different sizes are treated by such a tire vulcanizer, it is necessary to adjust the shaping stroke of the vulcanizer. This adjustment is generally carried out by replacement of a spacer provided in the lift cylinder. However, the work associated with such replacement is very time-consuming as the spacer is built in the cylinder. Furthermore, the prior art main mechanism is accompanied by other difficulties in making it water or oil tight and in arranging the piping because it employs a fluid as its driving power source.

Another type of the main mechanism, which employs a mechanical driving mechanism, has also been proposed as a countermeasure to the aforementioned drawbacks of the fluid-driven main mechanism. An example of such a main mechanism is disclosed in U.S. Pat. No. 3,487,507, which incorporates as its constituents a ball screw shaft and a ball nut. The rotary motion of the ball screw shaft is converted to the rectilinear motion of the ball nut, which rectilinear motion inflates or deflates a bladder through a tubular bladder ram connected with the ball nut. However, in this particular vulcanizer, before the green tire is molded under pressure by the upper and lower molds by lowering a socket holding the upper extremity of the bladder by the upper mold after the completion of the shaping of the green tire, the ball screw shaft is rotated by a signal from an electric circuit to lower the tubular bladder ram to a position ready for the pressure molding. This not only makes the main mechanism very complex but also causes the breakage of the main mechanism and leads to serious problems from the viewpoint of safety if the lowering speed and timing of the upper mold are mismatched with those of the lower mold.

SUMMARY OF THE INVENTION

The present invention has been completed to solve the aforementioned drawbacks of prior art tire vulcanizers. A primary object of this invention is to provide a tire vulcanizer equipped with a main mechanism capable of performing efficiently and safely the inflation and deflation operations of a bladder for shaping and curing a green tire. Another object of this invention is to provide a tire vulcanizer equipped with a main mechanism which permits construction the vulcanizer on a compact scale.

A first embodiment of this invention fulfilling the above objects is characterized by the provision of:

a lower ring for holding the lower extremity of an elastic mold into which a heating medium is introduced for performing a shaping and curing treatment on a green tire;

an upper ring for holding the upper extremity of the elastic mold and capable of moving vertically relative to said lower ring;

a cylinder coupled in a vertically displaceable fashion with said lower ring;

means for vertically displacing said upper ring, said means including rotary means disposed within said cylinder and formed of a ball screw shaft and a nut cylinder threaded on said ball screw shaft, means for converting a rotary motion of said rotary means to a rectilinear motion, means for revolving said ball screw shaft and means for stopping the rotation of said ball screw shaft; and control means for deactivating said stopping means in association with a motion to lower an upper mold unit after the completion of the vulcanization and shaping of said green tire.

A second embodiment of this invention is characterized by providing, in addition to those provided in the first embodiment, means for preventing overloading including detection means for sensing an overload to the ball screw shaft and stopping means for stopping the descent of the upper mold unit, or a shock absorption device provided at the lower extremity of the ball screw shaft for absorbing a thrust of the ball screw shaft to be caused by the upper mold unit.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
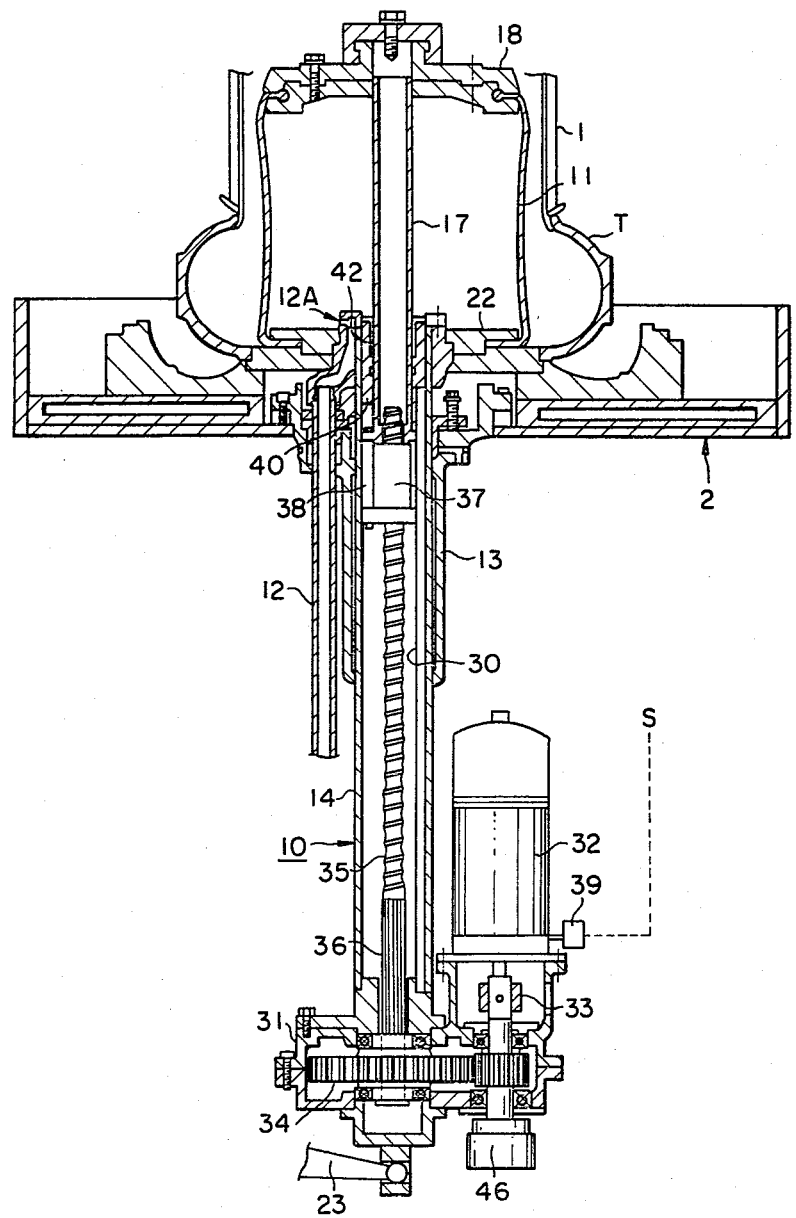
FIGS. 1 through 4 illustrate an embodiment of a tire vulcanizer according to this invention, in various operation strokes.

In FIG. 1 illustrating an embodiment of this invention, a cylinder guide 13 is fastened by bolts on a fixed lower mold unit 2, in which cylinder guide 13 a cylinder 14 is displaceably fitted for up and down movement. At an upper end portion of the cylinder 14, is provided a lower ring 22 for holding a lower end portion of an elastic mold 11. At a lower portion of the cylinder 14, there are provided driving means and power transmission means. In the illustrated embodiment, a transmission casing 31 consisting of an upper and lower halves is fixedly secured to a lower portion of the cylinder 14. On a protruded portion of the transmission casing 31, there is provided a reversible motor 32 equipped with a brake, whose motor shaft is connected with a reducing transmission gear 34 through a coupling 33 so as to interlock the motor shaft and gear 34 together. The gear 34 may be either one of helical gear, spur gear and bevel gear or, in some instances, a wrapping connector.

Within the cylinder 14, a ball screw shaft 35 coupled with the gear 34 is disposed coaxially with the cylinder 14. The driving force of the motor 32 is transmitted to the ball screw shaft 35 through the gear 34. A nut cylinder 37 is threaded on the ball screw shaft 35. By bringing a slide bushing 38 which serves as a holder for the nut cylinder 37 into engagement with a key 30, the rotary motion of the ball screw shaft 35 is converted into the vertical rectilinear motion of the nut cylinder 37. A connecting rod 17 of a hollow structure is provided, through a connector, continually with the nut cylinder 37. The connecting rod 17 terminates in an upper ring 18 for holding the upper end portion of the elastic mold 11.

Through the lower ring 22, there is formed an injection port 12A adapted to introduce an inflating medium for shaping, in other words, a heating medium such as steam or high temperature gas through a pipe 12. A cylindrical bearing 40 is fit in the cylinder 13 at the upper portion thereof. The connecting rod 17 is slidably fit in the cylindrical bearing 40 to restrain any horizontal movement of the connecting rod 17. A number of movable packings 42 may be interposed between the cylindrical bearing 40 and connecting rod 17 at an upper portion of the bearing 40, thereby to ensure the prevention of leakage of the heating and inflating medium (such as steam or gas) for the elastic mold 11.

The motor 32 is provided with a brake for stopping the rotation of the ball screw shaft 35 at a desired stage as well as brake-releasing means to deactivate the brake in accordance with a signal S indicating the completion of a shaping operation or a descent of the upper mold unit 3 and permit the ball screw shaft 35 to rotate freely.

Next, a curing and shaping cycle of a green tire T using the above embodied vulcanizer will be described in detail.

In FIG. 1, the elastic mold 11 shown in the form of a bladder is in a vertically elongated state. The green tire T has been loaded on the tire vulcanizer by holding the bead portion of the tire t with a vertical loader (the drawing shows as a part of the vertical loader an expandable arm 1 only).

While maintaining the above-described loaded state, the so-called shaping step is carried out. Namely, this shaping step is conducted by rotating the motor 32 in the normal direction while charging into the elastic mold 11 a heating medium of for example 0.5–3 Kg/cm$^2$, namely, pressurized steam or gas. The driving force of the motor 32 is transmitted, via the gear 34, ball screw shaft 35 and nut cylinder 37, to the connecting rod 17, thereby causing the upper ring 18 to lower and, as a result, assume a position shown in FIG. 2. Now, the shaping step has been completed.

The above shaping stroke can be applied extremely easily to green tires of various sizes and can also be controlled centrally by providing a position detector such as limit switch, proximity switch or photo switch at a place where a relative movement takes place and controlling this shaping stroke by a control computer or the like in accordance with signals from such a position detector. As an example of the position detector, a pulse generator 46 is provided with the motor shaft.

Figure 2:
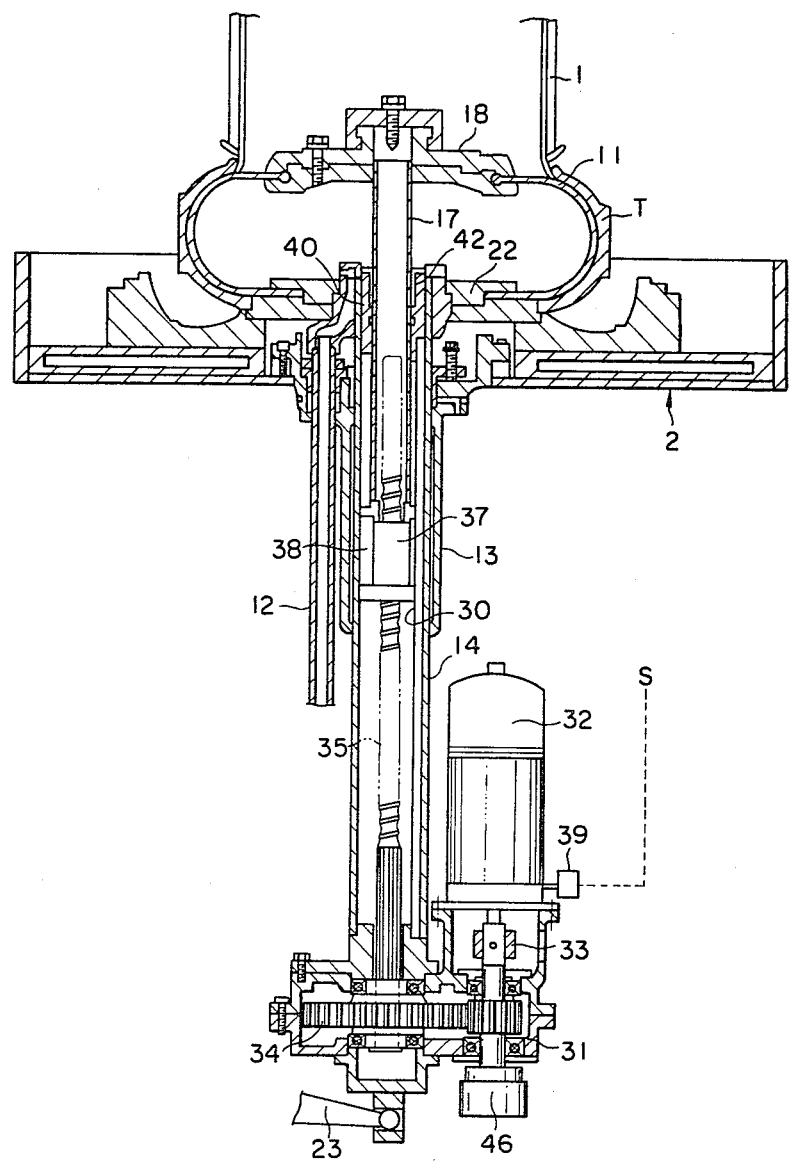

During the period from the initiation of the shaping step shown in FIG. 1 to the completion of the shaping step illustrated in FIG. 2, the distance between the bearing 40 and slide bushing 38 increases progressively. This improves the descent accuracy of the connecting rod 17 and, in turn, minimizes the swinging motion of the upper ring 18, thereby assuring the perfect shaping of green tires. In addition, this also allows employing as the movable packings 42 so-called V-packings or grand packings, to thereby ensure the perfect prevention of leakage of the pressing medium in the elastic die 11 and to prolong the service time of the packings 42.

Figure 3:
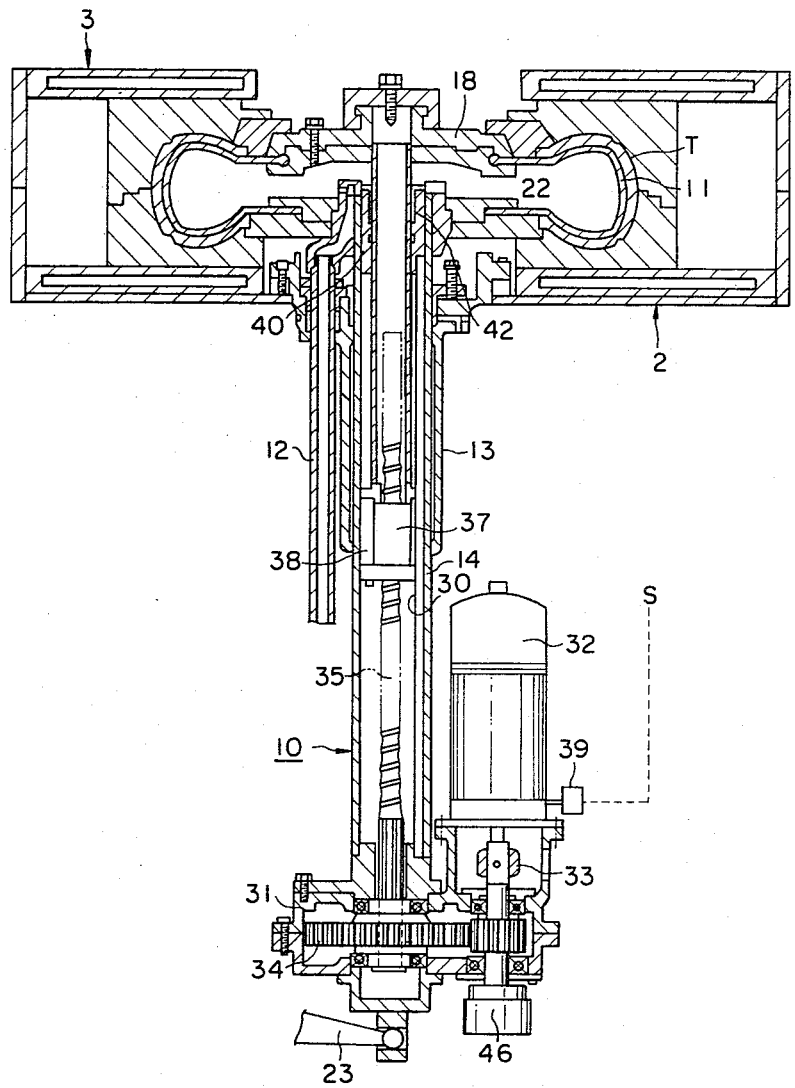

Upon completion of the shaping step as shown in FIG. 2, the arm 1 is retreated and a pressure molding is thereafter carried out by operating the movable upper mold unit 3 as illustrated in FIG. 3. At this stage, it is important to activate the brake-releasing means 39 in accordance with the signal indicating the completion of the shaping step or a descent of the movable upper mold unit 3, thereby releasing the brake of the motor 32 and keeping the ball screw shaft 35 in a freely-rotatable state. In this state, the upper mold unit 3 is lowered to push downwardly the upper ring 18. The ball screw shaft 35 of a small load is thus rotated by the rectilinear movement of the nut cylinder 37 owing to the thrusting force of the upper ring 18. The upper ring 18 has been lowered from the position shown in FIG. 2 to the position illustrated in FIG. 3, resulting in the completion of the pressure molding.

In the molding position shown in FIG. 3, the green tire T is vulcanized and shaped from both inner and outer sides thereof by increasing the pressure of the heating medium within the elastic mold 11 and, at the same time, providing the upper and lower mold units 3, 2 with a heat source.

Figure 4:
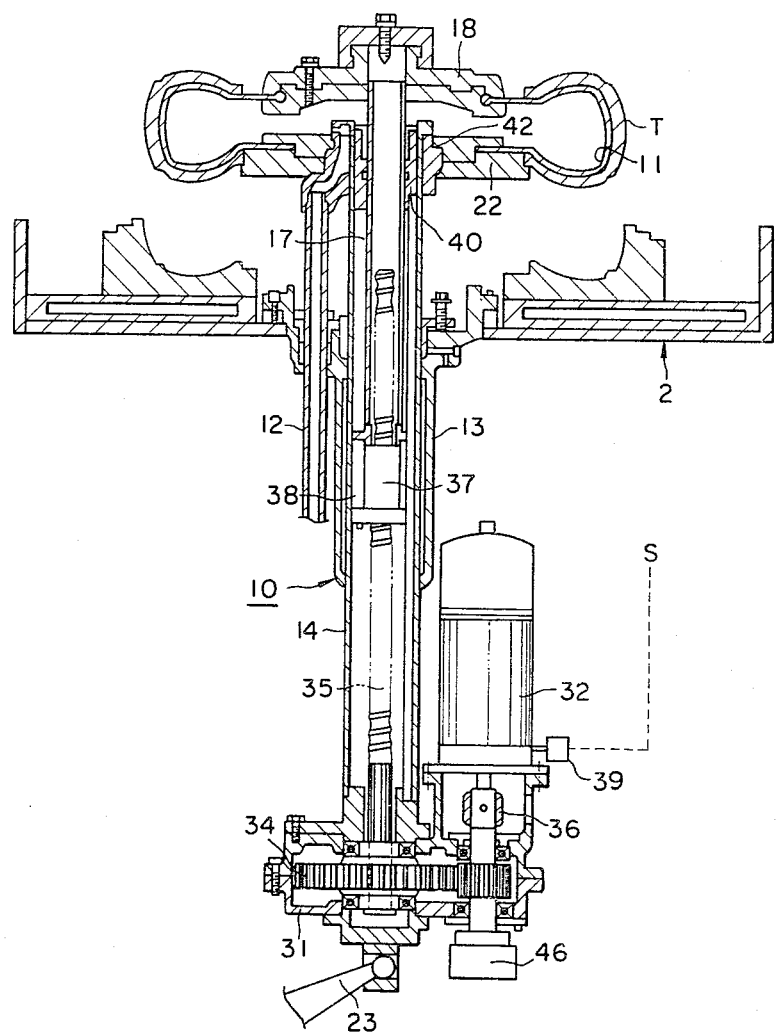

Upon completion of the curing, the upper mold unit 3 is opened and, thereafter, a lifting device 23 is operated as shown in FIG. 4 to lift the entire main mechanism 10. After completing this knock-out stroke, the motor 32 is rotated in the reverse direction so that the upper ring 18 is caused to ascend and the elastic mold 11 is axially elongated, thereby allowing dismounting of a shaped and vulcanized tire from the tire vulcanizer. The ascent stroke of the upper ring 18 may be controlled by the above-described pulse generator 46.

Following the dismounting of the shaped and vulcanized tire from the elastic mold 11, the lower ring 22 is lowered through the return motion of the lifting device 23. Now, the whole cycle of the shaping and curing of a green tire has been completed.

Figure 5:
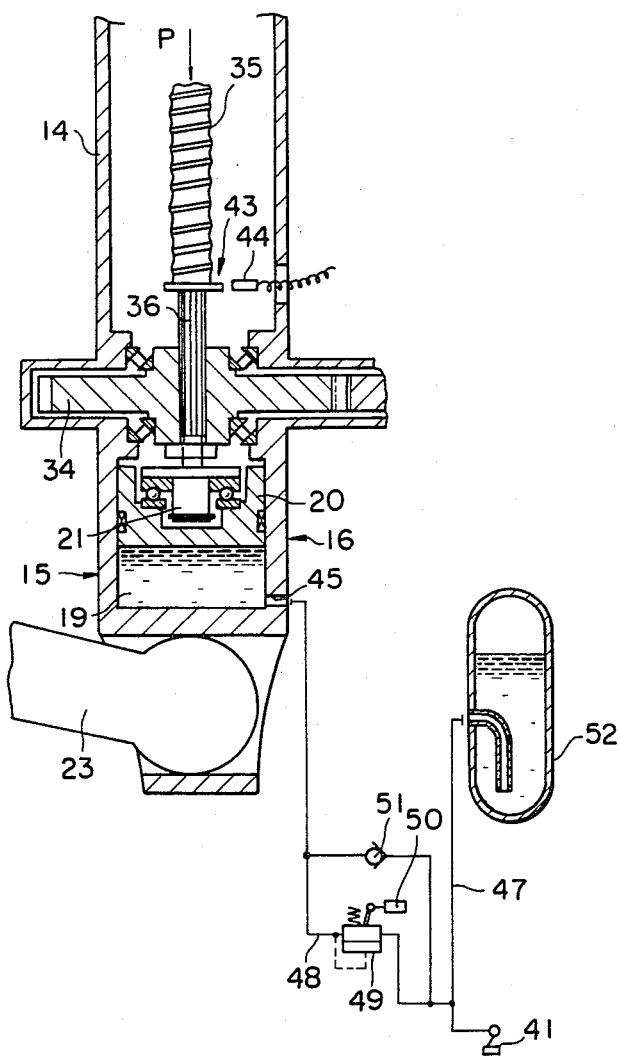
FIG. 5 is a fragmentary view of the embodiment of this invention, equipped with a safety device against overload.

During the aforementioned whole shaping and curing cycle, the main system 10 may incur serious damage if the ball screw shaft 35 and nut cylinder 37 are locked for various reasons or when the free rotation of the ball screw shaft 35 is hampered for such reason as the brake releasing operation not being followed for some unexpected reason. As means for solving these problems, an over-load safety device provided at a lower portion of the ball screw shaft 35 as illustrated in FIG. 5 functions effectively.

In the above embodiment, shock absorber unit 15 for absorbing shocks which may be exerted onto the ball screw shaft 35 is made up of a hydraulic cylinder 16, pressure oil 19 to be introduced into the cylinder 16, and a piston supported by the pressure oil 19. A lower end portion of the ball screw shaft 35 is formed into a spline shaft portion 36 which is rotatably and vertically displaceably inserted in the reducing transmission gear 34. A tail portion 21 provided at the lower extremity of the spline shaft portion 36 is rotatably journalled on the piston 20 through a bearing such as a single thrust bearing.

A detection piece 43 is provided at the upper extremity of the spline shaft portion 36, while a corresponding proximity switch 44 (for ensuring the upper limit of the piston 20) is disposed in the vicinity of the detection piece 43. When a shock absorber unit 15 constituted by the hydraulic cylinder 16, pressure oil 19 and piston 20 is employed, various means may be used to sense an overload P which may be applied onto the ball screw shaft 35. In the embodiment shown in FIG. 5, a hydraulic circuit for the pressure oil 19 is illustrated, which circuit contains a relief valve equipped with a limit switch. In FIG. 5, designated at numeral 45 is a charge/discharge port for the hydraulic cylinder 16. Numeral 52 indicates an oil reservoir. Numerals 47 and 48 are respectively a hydraulic circuit and relief circuit. The latter circuit includes a relief valve 49 and a limit switch 50. Designated at numeral 51 is a check valve provided with the hydraulic circuit 47.

Next, the operation and effects of the safety device against overload will be described. When an overload P is exerted in the direction indicated by an arrow in FIG. 5 onto the ball screw shaft 35 while the shaft 35 is rotating or moving up or down rectilinearly, the pressure oil 19 whose pressure has been adjusted to a preset value is compressed by the descent of the piston 20 and the relief valve 49 of the relief circuit 48 is eventually opened to drain the pressure oil into the reservoir 52. Thus, the opening of the relief valve 49 is sensed by the limit switch 50, resulting in the generation of an electrical signal. This signal then halts the lowering motion of a top linkage mechanism (not illustrated) for opening or closing the upper mold of the vulcanizer, thereby avoiding dangers which may be caused if the closing operation of the upper mold should have been continued and eliminating damages to the entire main mechanism due to the overload.

The effective stroke of the piston 20 in the hydraulic cylinder 16 (in other words, the descent stroke of the ball screw shaft 35) is set to be the sum of a distance for buffering the impact, which may be caused upon bringing the upper mold into contact with the upper ring 18, a distance required to absorb the overload, and an overrun distance preventing the top linkage mechanism for closing the upper mold from hitting its corresponding bottom if the top linkage mechanism should over-run. In order to buffer more effectively the impact which may be caused by contact of the upper die unit 3 with the upper ring 18, an accumulator of the bladder, piston or spring type, may be provided in the relief circuit 48. Namely, when the upper die unit 3 collides the upper ring 18, a resulting shock is first absorbed by the accumulator and, when an overload is present, the relief valve 49 is then opened. This opening of the relief valve 49 is detected by the limit switch 50 and the descent motion of the top link mechanism for opening or closing the upper mold of the vulcanizer is stopped. Instead of using the limit switch 50, it is possible to use the proximity switch 44 disposed opposite to the detection piece 43 on the ball screw shaft 35 and adapted for ensuring the upper limit of the vertical displacement of the piston.

When the overload P is exerted on the ball screw shaft 35 and the pressure of the pressure oil 19 in the cylinder 16 is increased due to a descent of the piston 20, this pressure increase is relieved by training the hydraulic oil into the reservoir 52 through the relief valve 49. At the same time, the displacement stroke of the ball screw shaft 35 is detected by means of the proximity switch 44 through the displacement of the detection piece 43 located on the ball screw shaft 35, thereby generating an electrical signal. This signal is sent as a brake signal to the driving mechanism of the top linkage mechanism for opening/closing the upper mold of the tire vulcanizer and stops the top linkage mechanism, resulting in the stoppage of the closure of the upper mold.

As other detection means, a pressure switch 41 may be provided with the hydraulic circuit 47 or a motion detector (not illustrated) for determining the revolution of the reducing transmission gear 34 may be installed in the transmission case 31. In place of the hydraulic cylinder 16, a member of a spring structure may be provided at the lower extremity of the ball screw shaft 35 to buffer any shocks which may be exerted onto the shaft 35.

As a modified embodiment of the above-described safety device for overload, the hydraulic cylinder 16 may be stretched in the axial direction of the screw 35 into a prolonged structur so as to use it as a fluid shock absorber for absorbing completely the mold-closing stroke of the screw shaft 35 (i.e., the distance which the upper ring 18 moves from the completion of the shaping stroke to the completion of the die-casting stroke) and buffering the mold-closing load. Here, after completing the shaping stroke, the upper mold unit 3 thrusts downwardly the upper ring 18 in the mold-closing stroke. However, this thrust is completely absorbed by the fluid shock absorber and, regardless whether the screw shaft is rotated or not, ensures the closure of the mold without causing any damages on the main mechanism. Accordingly, where such a fluid shock absorber is employed, the detection means for overloading would become unessential to the main mechanism and an ordinary screw shaft may be employed instead of the ball screw shaft.

Figure 6:
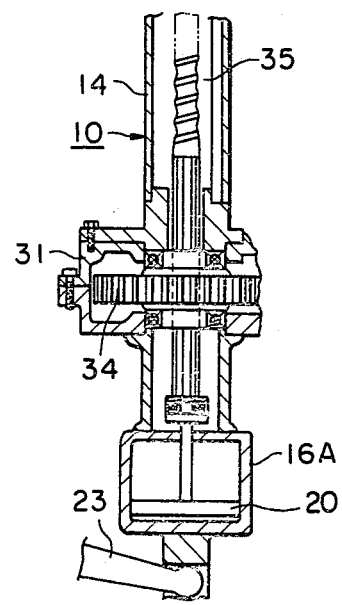
FIG. 6 is a fragmentary view of the embodiment of this invention, equipped with a shock absorption device.

FIG. 6 shows an embodiment incorporating a fluid shock absorber. In the drawing, the tire vulcanizer is in a stage having just finished the mold-closing stroke. The piston 20 is in a lowered position corresponding to the mold-closing stroke while buffering the thrust of the screw shaft caused by the upper mold unit 3 by means of the fluid within the cylinder 12. In this state, the curing is proceeded with and, upon completion of the curing, the resulting tire is knocked out in accordance with an operation similar to that of the embodiment shown in FIG. 4.

As understood from the above-described embodiments, the tire vulcanizer of this invention has the advantage that the spacing within the cylinder 14 can be used for varied purposes since it features a mechanical structure. For example, the pipe 12 for supplying the heating medium into the elastic mold 11 may be arranged in the cylinder 14. A temperature sensor for detecting the interior temperature of the elastic mold 14 while the heating medium is being supplied may be provided at an upper portion of the bearing 40 and the lead wire thereof may be extended through the cylinder 14. Thus, the tire vulcanizer of this invention facilitates the arrangement layout of varied parts or devices and enables suitable performance of various inspections.

Since the cylinder 14 is connected with the lower ring 22, the cylinder 14 may be rotated around its longitudinal axis by means of twist-driving means (not shown) so as to twist the elastic mold 11 via the lower ring 22 when a vulcanized tire is dismounted from the vertically elongated elastic mold 11 after the knock-out of the tire. By doing so, the work for dismounting a vulcanized tire from the elastic mold 11 can be performed easily without need for using vacuum, thereby enabling to shorten the operation time.

Although the connecting rod 17 is coupled with the nut cylinder 37 in the above embodiment, it may be modified by fixing the nut cylinder within the cylinder and causing the ball screw shaft to rotate by the driving force of the motor and to move rectilinearly up and down. In this modified embodiment, the upper end portion of the ball screw shaft serves as a connecting rod and the upper ring is installed slidably.

In addition, when the upper mold unit is lowered to perform the mold-closing and pressure-molding operation, an electric circuit may be arranged in such a way that the ball screw shaft can be slightly rotated in the direction, that lowers the nut cylinder, in accordance with a signal indicating the descent of the upper mold unit in order to lighten the load to be applied to the ball screw shaft.

The tire vulcanizer of this invention is constituted as described above. Thus, it can perform the shaping and curing operation of green tires efficiently and safely and is considered to be an outstanding tire vulcanizer from a practical point of view.

Having now fully described the invention, it will be apparent to one of ordinary skill in the art that many changes and modifications can be made thereto without departing from the spirit or scope of the invention as set forth herein.

What is claimed is:

1. A tire vulcanizer including a mutually closable upper and lower mold unit and a horizontally expandable elastic mold, and adapted to cure a green tire to be inserted within a hollow spacing defined by said upper and lower mold units while shaping the inner configuration of the green tire by virtue of said elastic mold and a heating and inflating medium to be charged into said hollow spacing, said vulcanizer comprising:
   a lower ring for holding the lower extremity of said elastic mold;
   an upper ring for holding the upper extremity of said elastic mold and capable of moving vertically relative to said lower ring;
   a cylinder coupled in a vertically displaceable fashion with said lower ring;
   means for vertically displacing said upper ring wherein said means further comprises rotary means disposed within said cylinder having a ball screw shaft, a nut cylinder threaded on said ball screw shaft, means for converting rotary motion of said rotary means to rectilinear motion, means for revolving said ball screw shaft, and means for stopping the rotation of said ball screw shaft; and
   control means for deactivating said stopping means in association with motion to lower said upper mold unit after the completion of the vulcanization and shaping of said green tire.

2. The tire vulcanizer as claimed in claim 1, further comprising:
   means for absorbing shocks exerted on said ball screw shaft;
   means for detecting a load applied to said ball screw shaft and for generating a signal upon occurrence of said load; and
   means for stopping the downward displacement of said upper mold unit in accordance with said signal from said load-detecting means.

3. The tire vulcanizer as claimed in claim 2, wherein said load-detecting means further comprises means for detecting said load to said ball screw shaft by virtue of a corresponding change in fluid pressure.

4. The tire vulcanizer as claimed in claim 2, wherein said load-detecting means further comprises means for detecting said load to said ball screw shaft in terms of downward displacement of said ball screw shaft.

5. The tire vulcanizer as claimed in claim 1, wherein said means for converting said rotary motion of said rotary means to the rectilinear motion further comprises means for converting the rotary motion of said ball screw shaft to the rectilinear motion of said nut cylinder, and wherein said tire vulcanizer further comprises a connecting rod coupling said nut cylinder with said upper ring and a cylindrical bearing provided between said cylinder and connecting rod at an upper end portion of said cylinder so as to guide the vertical displacement of said connecting rod.

6. A tire vulcanizer including a mutually closable upper and lower mold units and a horizontally expandable elastic mold, and adapted to cure a green tire to be inserted within a hollow spacing defined by said upper and lower mold units while shaping the inner configuration of the green tire by virtue of said elastic mold and a heating and inflating medium to be charged into said hollow spacing, said vulcanizer comprising:
   a lower ring for holding the lower extremity of said elastic mold;
   an upper ring for holding the upper extremity of said elastic mold and capable of moving vertically relative to said lower ring:
   a cylinder coupled in a vertically displaceable fashion with said lower ring;
   means for vertically displacing said upper ring wherein said means further comprises rotary means disposed within said cylinder and having a screw shaft, a nut cylinder threaded on said screw shaft, means for converting rotary motion of said rotary means to rectilinear motion, means for revolving said screw shaft, and means for stopping the rotation of said screw shaft at a desired time; and
   a shock absorption device provided at a lower end portion of said rotary means for absorbing a mold-closing stroke of said screw shaft descended and caused upon closing said upper and lower mold units so as to thereby buffer mold-closing loads.

7. The tire vulcanizer as claimed in claim 6, wherein said shock absorption device further comprises a cylinder defining in the interior thereof a hydraulic or pneumatic chamber and a piston connected to a lower extremity of said screw shaft and slidably received in said hydraulic or pneumatic chamber.

8. The tire vulcanizer as claimed in claim 6, wherein said means for converting said rotary motion of said rotary means to a rectilinear motion is adapted to convert the rotary motion of said screw shaft to the rectilinear motion of said nut cylinder, and said tire vulcanizer further comprises a connecting rod coupling said nut cylinder with said upper ring and a cylindrical bearing provided between said cylinder and connecting rod at an upper end portion of said cylinder so as to guide the vertical displacement of said connecting rod.

9. The tire vulcanizer as claimed in claim 1 or 6, further comprising a pipe for supplying or discharging said heating and inflating medium into or from said elastic mold, said pipe being disposed in said cylinder.

10. The tire vulcanizer as claimed in claim 1 or 6, further comprising a temperature sensor for detecting the temperature of said heating and inflating medium to be supplied into said elastic mold, said sensor being provided to an upper end portion of said cylinder.

11. The tire vulcanizer as claimed in claim 1 or 6, further comprising a twist driver for rotating said cylinder around its longitudinal axis wherein said driver further comprises said cylinder.

* * * * *